(12) United States Patent
Yamamoto et al.

(10) Patent No.: US 6,905,756 B2
(45) Date of Patent: Jun. 14, 2005

(54) TRANSFER FOIL HAVING LOW-REFLECTION LAYER AND PRODUCTION METHOD FOR MOLDED PRODUCT USING THIS

(75) Inventors: Seiichi Yamamoto, Joyo (JP); Yuzo Nakamura, Joyo (JP); Junichi Ikeda, Nara (JP); Hidesato Mano, Nara (JP)

(73) Assignees: Nakajima Kogyo Kabushiki Kaisha, Kyoto (JP); Kyoeisha Chemical Co., Ltd., Osaka (JP)

( * ) Notice: Subject to any disclaimer, the term of this patent is extended or adjusted under 35 U.S.C. 154(b) by 0 days.

(21) Appl. No.: 10/296,199

(22) PCT Filed: May 30, 2001

(86) PCT No.: PCT/JP01/04582

§ 371 (c)(1),
(2), (4) Date: Jul. 30, 2003

(87) PCT Pub. No.: WO01/92006

PCT Pub. Date: Dec. 6, 2001

(65) Prior Publication Data

US 2004/0028910 A1 Feb. 12, 2004

(30) Foreign Application Priority Data

May 31, 2000 (JP) ........................................ 2000-162768

(51) Int. Cl.$^7$ ................................................ B41M 5/40
(52) U.S. Cl. ..................... 428/195.1; 156/235; 428/212; 428/215; 428/216
(58) Field of Search ....................... 156/235; 428/195.1, 428/212, 215, 216, 32.77, 32.78

(56) References Cited

U.S. PATENT DOCUMENTS 6,413,687 B1 * 7/2002 Hattori et al. ................ 430/10

FOREIGN PATENT DOCUMENTS

| JP | 63-270123 | 11/1988 |
|----|-----------|---------|
| JP | 6-138420 | 5/1994 |
| JP | 7-108560 | 4/1995 |
| JP | 11-288225 | 10/1999 |
| JP | 2000-158599 | 6/2000 |
| JP | 2001-264510 | 9/2001 |
| JP | 2001-270293 | 10/2001 |

* cited by examiner

Primary Examiner—Bruce H. Hess
(74) Attorney, Agent, or Firm—Shinjyu Global IP

(57) ABSTRACT

A transfer sheet having a low-reflection layer characterized by comprises: a transparent low-reflection layer; a protective layer; and an adhesive layer successively laminated on a releasable base film.

19 Claims, No Drawings

TRANSFER FOIL HAVING LOW-REFLECTION LAYER AND PRODUCTION METHOD FOR MOLDED PRODUCT USING THIS

TECHNICAL FIELD

The present invention relates to a transfer sheet having a low-reflection layer and a method of manufacturing a molded article utilizing the same. In particular, it relates to a transfer sheet having a low-reflection layer excellent in anti-reflective property and a method of manufacturing a molded article utilizing the same.

BACKGROUND ART

According to advance of plastic molding techniques in recent years, molded plastic articles have been diversified and further sophistication of the molded plastic articles has been required.

For example, there is a method of applying a sophisticated design to the molded plastic article by painting the surface thereof. The painting may be performed after the molding of the article by heat transfer, water transfer, screen printing and pad printing, or the painting and the molding may be performed simultaneously by insert molding [see Japanese Unexamined Patent Publication No. Hei 6(1994)-247058; Synthetic Resin, vol. 37, No. 5 (1991), etc.].

Some of the molded plastic articles require various properties such as resistance to scratching, antistatic property, hard coating or anti-reflective property, depending on their use. To meet such a requirement, there has been proposed a method of successively adhering layers each having the above-mentioned properties on the molded article (see Japanese Unexamined Patent Publications Nos. Hei 7(1995)-148881, Hei 10(1998)-235770; Hei 11 (1999)-326602, etc.).

According to the methods of painting the surface of the molded article or providing the functional layers on the molded article, however, the steps therefor are complicated, which reduces production efficiency and increases production costs so that low-priced final products cannot be obtained. Further, after the molding, it is difficult to paint or firmly adhere the functional layers to the molded article having a surface with a three-dimensional curve or minute unevenness, which leads to physical damages such as exfoliation of the layers.

On the other hand, according to the method of simultaneously performing the painting and the molding, steps thereof are simplified. However, to give the properties as described above, it is still necessary to adhere the functional layers to the surface of the molded article. That is, in the present situation, the reduction of the production costs and the prevention of physical damages for the functional layers have not been achieved yet.

DISCLOSURE OF INVENTION

The invention is performed in view of the above problems and provides a transfer sheet having a low-reflection layer, with which a functional property can be transferred simultaneously with the molding of the article so that desired functional properties such as anti-reflective properties, resistance to scratching, resistance to light, antistatic properties and electromagnetic wave blocking properties are easily and surely given to the molded article, and a method of manufacturing a molded article utilizing the transfer sheet.

According to the present invention, provided is a transfer sheet having a low reflection layer comprising: a transparent low-reflection layer, a protective layer and an adhesive layer successively stacked on a releasable base film.

Further, according to the present invention, provided is a method of manufacturing a molded article comprising the steps of: sandwiching the above-mentioned transfer sheet having a low-reflection layer between injection dies; injecting a melted resin composition over the adhesive layer side of the transfer sheet to simultaneously form a resin molded article and adhere to a surface of the resin molded article; and exfoliating the releasable base film of the transfer sheet, or placing the transfer sheet having a low reflection layer on a molded article so that the adhesive layer contacts the molded article; applying thermocompression from the base film side, thereby adhering the transfer sheet to a surface of the molded article; and exfoliating the releasable base film of the transfer sheet.

PREFERRED EMBODIMENT OF INVENTION

The transfer sheet having a low-reflection layer according to the present invention (hereinafter merely referred to as "a transfer sheet") is mainly comprised of a transparent low-reflection layer, a protective layer and an adhesive layer successively stacked on a releasable base film.

A material of the base film applicable to the present invention is not particularly limited, but a transformable or flexible plastic film is suitable. Examples thereof include an orientated or non-orientated transparent plastic film made of a polyester, a cellulose acetate, a polypropylene, a polyethylene, a polyamide, a polyimide, a polyether sulfone, a polysulfone, a polyvinyl acetal, a polyetheretherketone, a polyvinyl chloride, a polyvinylidene chloride, a methyl polyacrylate, a polymethylmethacrylate, a polycarbonate, a polyurethane and the like. The thickness of the base film is not particularly limited, but for example, it may be about 3 to 500 μm.

The base film itself may have a release property so that a transparent low-reflection layer to be mentioned later is not transferred to the base film when it is exfoliated from the base film. For example, the base film may be given with the release property, for example, by adding a releasing agent such as waxes, salts or esters of higher fatty acids, fluoroalkylated compounds, polyvinyl alcohol, low molecular weight polyethylene or the like. The base film of either case can be used as the releasable base film.

If the release property of the base film is not sufficient with respect to the transparent low-reflection layer, a releasing layer is suitably formed on the base film.

The releasing layer may be made of (meth)acrylic resins, urethane resins, melamine resins, epoxy resins, epoxymelamine resins, amino alkyd resins, silicon resins, fluororesins, olefin resins, or compound resins thereof.

The releasing layer may be formed by applying the above-mentioned material to the base film by a method known per se, e.g., gravure coating, roll coating, spray coating, lip coating, dip coating, spin coating, bar coating, extrusion coating, screen coating or the like and then drying or curing the material. The thickness of the releasing layer may be about 0.1 to 10 μm.

The transparent layer may be made of any material as long as it can reduce a refractive index of an article onto which the transfer sheet is to be transferred (e.g., a molded article, etc), protective layer and/or an adhesive layer to be mentioned later, e.g., reflection of light is reduced to about 20% or less, preferably about 10% or less, more preferably about 5% or less of incident light. To give such a property, the transparent low-reflection layer may be formed to have a surface with minute unevenness or a predetermined refractive index. Alternatively, the transparent layer may be constituted of two or more layers having different refractive indices.

The refractive index of the transparent layer may be about 1.3 to 1.9. In particular where the transparent layer is made of a single layer, the refractive index thereof may preferably be about 1.3 to 1.5. Further, where the transparent layer is constituted of the two layers having different refractive indices, the refractive indices are not particularly limited, but preferably, one of the layers has the refractive index of about 1.3 to 1.5 and the other layer has the refractive index of about 1.5 to 1.9. In this case, the layer having the refractive index of about 1.3 to 1.5 locates at the releasable base film side, preferably contacts the releasable base film. In other words, the layer having the refractive index of about 1.3 to 1.5 will be located at the outermost when the transfer sheet of the present invention is transferred to a molded article in a later step.

The transparent layer having the refractive index 1.3 to 1.5 may be made of fluoro-olefin copolymers, polymers having a fluorine-containing aliphatic ring structure, perfluoroalkylether copolymers, fluorine-containing (meth) acrylate polymers or a mixture of two or more kinds of them even though the layer may be formed of a single layer or plural layers having different refractive indices.

The transparent layer having the refractive index of 1.5 to 1.9 may be made of polyalkyl (meth)acrylates (e.g., polymethyl (meth)acrylate, polyethyl (meth)acrylate, polypropyl (meth)acrylate and the like), polystyrenes, polycarbonates, polyethylene terephthalates, polyvinyl chlorides, polyvinyl naphthalenes, polyvinyl carbazoles or a mixture of two or more kinds of them.

The thickness of the transparent layer may be about 0.01 to 5.01 $\mu$m. Specifically, in the case where the transparent layer is made of a single layer having a predetermined refractive index, the thickness thereof may be about 0.01 to 0.2 $\mu$m, preferably about 0.08 to 0.15 $\mu$m. In the case where the transparent layer is constituted of two layers having different refractive indices, the layer of the refractive index of 1.3 to 1.5 has a thickness of about 0.01 to 0.2 $\mu$m, preferably about 0.08 to 0.15 $\mu$m. The layer of the refractive index 1.5 to 1.9 may have a thickness of about 0.01 to 5.0 $\mu$m, preferably 0.08 to 5.0 $\mu$m. The two layers comprising the transparent layer may not necessarily have the same thickness.

The transparent layer may be formed by a method known per se in the same manner as the formation of the releasing layer.

The protective layer is not particularly limited as long as it can protect, an article onto which the transfer sheet is to be transferred, as well as an adhesive layer and/or a pattern layer to be mentioned later, from scratching, humidity, oxygen, light and the like. The protective layer may be formed of a transparent resin layer. The protective layer is formed, on the above mentioned transparent low-reflection layer, applying the material by a method known per se, e.g., gravure coating, roll coating, spray coating, lip coating, dip coating, spin coating, bar coating, extrusion coating, screen coating or the like and then drying the material. The thickness thereof may be about 1 to 50 $\mu$m.

According to the present invention, the protective layer preferably functions as a hard coat. Preferably the protective layer further has at least one or more properties of an antistatic property, an electromagnetic wave blocking property and a resistance to light.

The "hard coat" is to give an article to which the transfer sheet is to be transferred a degree of hardness greater than that of the article. Specifically, the protective layer may apply to the article, for example, a degree of hardness of 2H or more measured by a pencil hardness test of JIS-K5400, or a degree of hardness such that the article is not damaged even if scratched with a steel wool #000 reciprocating 50 times within a distance of 2 cm at 2 reciprocations/sec under load of 300 g/cm$^2$. Alternatively, the protective layer may be applied a degree of hardness such that $\Delta H$ of 10 or less is exhibited under a Taber abrasion test in which the article is rotated 100 times using a CS-10F truck wheel under load of 500 g.

The protective layer is formed of a resin cured by an active energy beam irradiation, such as an ultraviolet curing resin and an electron beam curing resin or a thermosetting resin.

As the resin cured by an active energy beam irradiation, can be used an oligomer or a prepolymer having a polymerizable double bond which is an element for forming a coating film, added with a reactive diluent and an optional (in the case of the ultraviolet curing resin) photopolymerization initiator.

Examples of the oligomer or the prepolymer having the polymerizable double bond include those of polyester, urethane, epoxy, polyether, acryl and the like. They may be used singly or in combination of two or more kinds of them.

The reactive diluent may be a vinyl compound, for example, 2-ethylhexylacrylate, lauryl acrylate, divinylbenzene, trimethylolmethane tri(meth)acrylate, trimethylolethane tri(meth)acrylate, trimethylolpropane tri (meth)acrylate, tetramethylolmethane tetra(meth)acrylate, hexanediol di(meth)acrylate, tripropyleneglycol di(meth) acrylate, pentaerythritol tri(meth)acrylate, neopentylglycol di(meth)acrylate or the like. These may be used singly or in combination of two or more kinds of them.

The photo-polymerization initiator may be of acetophenones such as diethoxyacetophenone, of benzoinethers such as isobutylbenzoinether, of benzylketals such as benzyldimethylketal, or of ketones such as benzophenone. These may be used singly or in combination of two or more kinds of them.

The thermosetting resin may be of multifunctional acrylic oligomers, silica sol, urethane resins, epoxy resins, melamine resins or compound resins thereof.

The "antistatic property" signifies that the protective layer has a resistance of about $10^6$ to $10^{12}$ $\Omega \cdot cm^2$, or about $10^9$ to $10^{12}$ $\Omega \cdot cm^2$.

The antistatic property may be given to the protective layer by adding a surfactant, a conductive filler and/or a conductive polymer solely or in combination of two or more of them to a material comprising the protective layer. With respect to a total weight of the protective layer, the surfactant and the conductive polymer may be added in an amount ranging from about 5 to 50 wt % and the conductive filler may be added in an amount ranging from about 100 to 400 wt %.

The surfactant may be anionic, cationic, ionic or nonionic. Among them the cationic surfactant is often utilized.

The conductive filler may be powder of carbon black, metal powders such as powders of copper, nickel, silver, iron or a compound thereof, or metal oxide powders such as powders of zinc oxide, tin oxide, titanium oxide or the like.

The conductive polymer may be polypyrrole, polyaniline, polythiophene or the like.

The "electromagnetic wave blocking property" signifies that the protective layer has a shielding capacity of 60 dB or more. The electromagnetic wave blocking property may be given to the protective layer by adding thereto a conductive filler or a magnetic filler. These fillers may suitably be added in an amount ranging from about 100 to 400 wt % with respect to the total weight of the protective layer.

The conductive filler may be those indicated above. The magnetic filler may be graphite, carbon, iron or the like.

The "resistance to light" is to prevent an article to which the transfer sheet is to be transferred from any changes after going through a fadeometer test in laboratory or in car for about 100 to 400 hrs, or a whetherometer test in an outdoor condition for about 800 to 1000 hrs. The resistance to light may be given to the protective layer by adding an ultraviolet absorber, an antioxidant/stabilizer or the like. These substances may suitably be added, for example, in an amount ranging from 5 to 20 wt % with respect to the total weight of the protective layer.

The ultraviolet absorber may be, for example, that of benzotriazoles such as hydroxyphenylbenzotriazole, of triazines such as hydroxyphenyl-S-triazine or the like.

The antioxidant/stabilizer may be, for example, a hindered amine photostabilizer called as hulsite.

In the case of simultaneously giving two, three or four of the above-mentioned properties to the protective layer, the substances capable of giving the properties are added in the above-mentioned amount ranges.

The adhesive layer may be made of acrylic resins, chlorinated olefin resins, resins of vinyl chloride-vinyl acetate copolymer, maleic acid resins, chlorinated rubber resins, cyclorubber resins, polyamide resins, cumarone indene resins, resins of ethylene-vinyl acetate copolymer, polyester resins, urethane resins, styrene resins or the like. The thickness of the adhesive layer may be about 0.1 to 10 $\mu$m. The adhesive layer can be formed by a method known per se as in the same manner as the formation of the releasing layer.

According to the present invention, a pattern layer may be provided between the protective layer and the adhesive layer. The pattern layer signifies a print ink layer in which letters, patterns and the like are formed with a print ink containing a coloring agent such as a known pigment or dye. The pattern layer may not necessarily be formed uniformly between the protective layer and the adhesive layer, but may be formed to have a thickness ranging from 0 to 50 $\mu$m depending on the patterns and colors used.

In the context of the present invention, an anchor layer may be formed between the base film and the transparent low-reflection layer, between the transparent low-reflection layer and the protective layer and/or between the protective layer and the pattern layer. The anchor layer is a kind of adhesive layer, which may be formed of an adhesive agent of urethane, titanate, isocyanate or polyethyleneimine. The thickness of the anchor layer may be, for example, about 0.1 to 5 $\mu$m.

According to the method of manufacturing the molded article of the present invention, a molded article is formed by inserting/sandwiching the transfer sheet in/between injection die(s) and injecting a melted resin composition to the adhesive layer side of the transfer sheet. As a result, the transfer sheet is adhered to the surface of the molded article. After exfoliating or peeling the releasable base film, low reflectivity and protective properties (hard coat, antistatic property, electromagnetic wave blocking property and/or resistance to light) are given to the surface of the molded article.

The molded article is not particularly limited. Examples thereof include, for example, surfaces of plates or polarizing plates used in various displays for word processors, computers, television sets, display panels, cellular phones, liquid crystal display devices and the like; optical lenses such as lenses formed of transparent plastic materials of sunglasses, glasses or viewfinders of cameras; display sections of various measuring instruments; windowpanes of cars and trains. These molded articles may be formed of materials other than resins, i.e., glass or the like, showing the effects similar to those exhibited by the resins.

The resin composition for the molded article are not particularly limited as long as it can constitute the above-described surfaces of the polarizing plates, the optical lenses, the display sections of the measuring instruments and the windowpanes of cars and trains. For example, the resins may be acrylic resins, styrene resins (ABS, AS, polyphenylene-oxydostyrene copolymer), polyolefin resins (polyethylene, polypropylene), polycarbonate resins in a melted state. These may be used singly or in combination of two or more kinds of them.

The injection die is not particularly limited as long as it is generally used for manufacturing the molded articles.

According to another method of manufacturing the molded article of the present invention, the transfer sheet is placed on the molded article so that the adhesive layer contacts the surface of the molded article and then heat and/or pressure are applied to the transfer sheet from the base film side to adhere the transfer sheet to the surface of the molded article. Then, the base film is exfoliated or peeled to provide the surface of the molded article having low reflectivity and protective properties (hard coat, antistatic property, electromagnetic wave blocking property and/or a resistance to heat).

For example, the application of heat and/or pressure from the base film side may be performed by using a silicon rubber roller. In this case, it is suitable to set a surface temperature of the silicon rubber roller to about 150 to 250° C. and/or an applied pressure to about 5 to 20 kg/cm$^2$.

EXAMPLES

Hereinafter, the transfer sheet and the method of manufacturing the molded article utilizing the same will be described.

Example 1

To a polyethylene terephthalate film of 38 $\mu$m thick (F-39, Toray Industries, Inc.), a releasing agent of epoxymelamine resin was applied by gravure coating in a thickness of 1 $\mu$m to obtain a releasable base film.

A transparent amorphous fluororesin having a refractive index of 1.34 (Cytop CTX-807AP manufactured by Asahi Glass Co., Ltd.) was applied to the base film by gravure coating to form a low-reflection layer having a thickness of 0.1 $\mu$m. Then, this was dried at 100° C. for 60 seconds to form a transparent low-reflection layer.

To the transparent low-reflection layer, a UV resin of the following composition was applied to have a thickness of 5 $\mu$m as a protective layer.
- 15 wt % of urethane acrylate oligomer (Beamset 575CB by Arakawa Chemical Co., Ltd.)
- 30 wt % of urethane acrylate polymer (Beamset NK-3 by Arakawa Chemical Co., Ltd.)
- 4 wt % of photo-polymerization initiator (Ylgacure 184 by Chiba Specialty Chemicals Co., Ltd.)

−6 wt % of reactive ultraviolet absorbent (RUVA-206 by Ohotsuka Chemical Co., Ltd.)
−25 wt % of methylethylketone
−20 wt % of anone After drying the solvent at 150° C. for 20 seconds, the UV resin was irradiated with ultraviolet rays at 400 mJ/cm$^2$ to form a protective layer as a hard coat having a resistance to light.

To the protective layer, a desired pattern of acrylic ink was applied as a pattern layer by gravure coating. An acrylic resin layer was then applied on the pattern layer as an adhesive layer again by gravure coating. Thus, a transfer sheet was completed.

Example 2

The transfer sheet obtained in Example 1 was sandwiched between injection dies and the dies were heated to 55° C. An acrylic resin melted at about 240° C. (Acrypet VH, Mitsubishi Rayon Co., Ltd.) was injected in the dies at a resin pressure of 300 kg/cm$^2$ in accordance with a simultaneous transfer-molding method and left stand for cooling.

The base film was then exfoliated to obtain a display cover for a cellular phone having the low-reflection layer on its surface and applied with a hard coat having resistance to light.

Example 3

To a polyethylene terephthalate film of 38 μm thick (D-120E, Mitsubishi Plastics Industries Ltd.), a releasing agent of epoxymelamine resin was applied by gravure coating in a thickness of 1 μm to obtain a releasable base film.

A transparent fluororesin having a refractive index of 1.41 (Opstar JN7215, JSR Co., Ltd.) was applied to the base film by gravure coating to form a layer of low refractive index of 0.09 μm thick. This was dried at 140° C. for 60 seconds.

Then, an acrylic resin having a refractive index of 1.68 (Opstar JN7102, JSR Co., Ltd.) was applied to the layer of low refractive index by gravure coating to form a layer of high refractive index of 0.12 μm thick. This was dried at 140° C. for 60 seconds.

Further, a protective layer as a hard coat having an antistatic property was formed on the layer of high refractive index by gravure coating.

The protective layer was formed by applying a UV resin of the following composition to a thickness of 5 μm.
−4 wt % of urethane acrylate oligomer (Beamset 575CB by Arakawa Chemical Co., Ltd.)
−8 wt % of urethane acrylate polymer (Beamset NK-3 by Arakawa Chemical Co., Ltd.)
−0.4 wt % of photoinitiator (Ylgacure184 by Chiba Specialty Chemicals)
−70 wt % of tin oxide conductive filler of solvent dispersion type (SN-100P by Ishihara Tech Co., Ltd)
−9.6 wt % of methylethylketone
−8 wt % of anone After drying the solvent at 150° C. for 20 seconds, the UV resin was irradiated with ultraviolet rays at 400 mJ/cm$^2$ to form a protective layer.

To the protective layer, a desired pattern of acrylic ink was applied as a pattern layer by gravure coating. An acrylic resin layer was then applied on the pattern layer as an adhesive layer again by gravure coating. Thus, a transfer sheet was completed.

Example 4

The transfer sheet having the transparent low-reflection layer obtained in Example 2 was sandwiched between injection dies and the dies were heated to 55° C. An acrylic resin melted at about 240° C. (Acrypet VH, Mitsubishi Rayon Co., Ltd.) was injected in the dies at a resin pressure of 300 kg/cm$^2$ in accordance with a simultaneous transfer-molding method and left stand for cooling.

The base film was then exfoliated to obtain a display cover for a cellular phone having the low-reflection layer on its surface and applied with a hard coat having an antistatic property.

Example 5

To a polyethylene terephthalate film of 38 μm thick (F-39, Toray Industries, Inc.), a releasing agent of epoxymelamine resin was applied by gravure coating in a thickness of 1 μm to obtain a releasable base film.

A transparent fluororesin having a refractive index of 1.41 (Opstar JM5010 produced by JSR Co., Ltd.) was applied to the base film by gravure coating to form a layer of low refractive index of 0.1 μm thick. This was dried at 140° C. for 60 seconds. After drying the solvent, the layer of low refractive index was irradiated with ultraviolet rays at 400 mJ/cm$^2$ under purging with nitrogen.

An acrylic resin having a refractive index of 1.68 (Opstar JN7102, JSR Co., Ltd.) was applied to the layer of low refractive index by gravure coating to form a layer of high refractive index of 0.12 μm thick. This was dried at 140° C. for 60 seconds.

Further, a protective layer as a hard coat having an electromagnetic wave blocking property was formed thereon by gravure coating.

The protective layer was formed by applying a UV resin of the following composition to have a thickness of 5 μm.
−30 wt % of acrylate UV resin (Aulex No. 340 by Thugoku Paint Co., Ltd.)
−4 wt % of photoinitiator (Ylgacure184 by Chiba Specialty Chemicals)
−26 wt % of conductive filler (Pastran by Mitsui metal Co., Ltd.)
−20 wt % of methylethylketone
−30 wt % of anone After drying the solvent at 150° C. for 20 seconds, the UV resin was irradiated with ultraviolet rays at 200 mJ/cm$^2$ to form a protective layer.

To the protective layer, a desired pattern of acrylic ink was applied as a pattern layer by gravure coating. An acrylic resin layer was then applied on the pattern layer as an adhesive layer again by gravure coating. Thus, a transfer sheet was completed.

Example 6

The transfer sheet having the transparent low-reflection layer obtained in Example 5 was sandwiched between injection dies and the dies were heated to 55° C. An acrylic resin melted at about 240° C. (Acrypet VH, Mitsubishi Rayon Co., Ltd.) was injected in the dies at a resin pressure of 300 kg/cm$^2$ in accordance with a simultaneous transfer-molding method and left stand for cooling.

The base film was then exfoliated to obtain a display cover for a cellular phone having the low-reflection layer on its surface and applied with a hard coat having an electromagnetic wave blocking property.

Example 7

On the adhesive layers of the transfer sheets obtained in Examples 2, 4 and 6, injection-molded articles of an acrylic resin (Acrypet VH, Mitsubishi Rayon Co. Ltd.) were placed, respectively. These were heated and pressurized from the base film side of the transfer sheet by using a silicon rubber roller having a degree of hardness of 80 to adhere the transfer sheets to the articles. A surface temperature of the silicon rubber roller was 230° C. and an applied pressure was 10 kg/cm$^2$.

Thereafter, the base films were exfoliated to obtain display covers for cellular phones each having the low-reflection layer on their surfaces and applied with a hard coat, as well as resistance to light, an antistatic property or an electromagnetic wave blocking property.

Example 8

To a polyethylene terephthalate film of 38 μm thick (F-39, Toray Industries, Inc.), a releasing agent comprising a higher alcoholic methacrylate—OH group-containing methacrylate copolymer containing hexamethylenediisocyanulate as a crosslinking agent was applied by gravure coating to have a thickness of 1 μm. This was heated at 150° C. for 30 seconds for curing to obtain a releasable base film.

To the base film, a layer of low refractive index comprising a carboxylic acid-containing fluoroacrylic copolymer and an epoxy resin crosslinking agent and showing a refractive index of 1.41 was applied by gravure coating to have a thickness of 0.1 μm. This was cured by heating at 150° C. for 30 seconds.

Then, a layer of high refractive index comprising urethane acrylate of a condensed polycyclic hydrocarbon structure and showing a refractive index of 1.59 was applied thereto by gravure coating to have a thickness of 3 μm. This was dried at 100° C. for 30 seconds. After the solvent was dried, the layer of high refractive index was irradiated with ultraviolet rays at 200 mJ/cm$^2$ under purging with nitrogen.

Then, in the same manner as in Example 1, a protective layer as a hard coat having resistance to light, a pattern layer and an adhesive layer were successively formed thereon to complete a transfer sheet.

Example 9

The transfer sheet obtained in Example 8 was sandwiched between injection dies and the dies were heated to 55° C. An acrylic resin melted at about 240° C. (Acrypet VH, Mitsubishi Rayon Co., Ltd.) was injected in the dies at a resin pressure of 300 kg/cm$^2$ in accordance with a simultaneous transfer-molding method and left stand for cooling.

The base film was then exfoliated to obtain a display cover for a cellular phone having the low-reflection layer on its surface and applied with a hard coat and an electromagnetic wave blocking property.

Example 10

On the adhesive layer of the transfer sheet obtained in Example 8, an injection-molded article of an acrylic resin (Acrypet VH, Mitsubishi Rayon Co. Ltd.) was placed. This was thermocompressed from the base film side of the transfer sheet using a silicon rubber roller having a degree of hardness of 80 to adhere the transfer sheet to the article. A surface temperature of the silicon rubber roller was 230° C. and an applied pressure was 10 kg/cm$^2$.

Thereafter, the base film was exfoliated to obtain a display cover for a cellular phone having the low-reflection layer on its surface and applied with a hard coat, as well as resistance to light, an antistatic property or an electromagnetic wave blocking property.

The articles finally obtained in the above Examples had low reflectivity on their surfaces. In comparison with an article comprising layers each applied with a hard coat, having resistance to light, an antistatic property or an electromagnetic wave blocking property, the articles of the Examples showed these properties more efficiently.

Further, all the obtained articles were excellent in resistance to scratching, and physical damages such as exfoliation of the layers were hardly observed.

According to the present invention, the transparent low-reflection layer, the protective layer and the adhesive layer are successively stacked on the releasable base film. Therefore, a multifunctional transfer sheet having low reflectivity and protective properties is provided.

In particular, in the case where the transparent low-reflection layer is made of an organic polymer and has a refractive index of 1.3 to 1.5 and a thickness of 0.08 to 0.15, or in the case where the transparent low-reflection layer is constructed of two layers made of an organic polymer having different refractive indices, one of the two layers having a refractive index of 1.3 to 1.5 and a thickness of 0.08 to 0.15 μm, the other layer having a refractive index of 1.5 to 1.9 and a thickness of 0.08 to 5.0 μm, and the layer of the lower refractive index contacting the releasable base film, the reflectivity lowered to a further extent can be applied.

In the case where the protective layer is as a hard coat, or in the case where the protective layer further has at least one or more properties of an antistatic property, an electromagnetic wave blocking property and resistance to light, the protective layer having multiple properties can be formed with a single layered structure. Therefore, physical damages such as exfoliation of the layers are prevented and the layer having the multiple properties can be located at the outermost of the molded article in a final stage. Thus, the properties are surely exhibited.

Further, in the case where the pattern layer is provided between the protective layer and the adhesive layer, sophisticated design is added to the molded article as an additional value.

Still further, in the case where the molded article is manufactured by sandwiching the transfer sheet between injection dies and injecting a melted resin to the adhesive layer side to simultaneously form the molded resin article and adhere to a surface of the molded article, or by placing the transfer sheet on a molded article so that the adhesive layer contacts the molded article and applying thermocompression from the base film side to adhere to a surface of the molded resin article, and then the releasable base film is exfoliated, an anti-reflective property and protective properties (e.g., resistance to scratching, resistance to light, antistatic property, electromagnetic wave blocking property) are added easily and surely to the surface of the molded article. Therefore, simplification of the manufacturing steps thereof and cost reduction, as well as price reduction are realized, while providing additional values with the molded article.

What is claimed is:

1. A transfer sheet comprising:
   a transparent low-reflection laminate;
   a protective layer; and
   an adhesive layer successively laminated on a releasable base film,
   wherein the transparent low-reflection laminate comprises two layers formed only of organic polymers and having different refractive indices, one of the two layers having a refractive index of 1.3 to 1.5 and a thickness of 0.08 to 0.15 μm, the other layer having a refractive index of 1.5 to 1.9 and a thickness of 0.08 to 5.0 μm, and the other layer having a lower refractive index being located at the releasable base film side.

2. A transfer sheet according to claim 1, wherein the layer having a lower refractive index of the transparent low-reflection laminate contacts the releasable base film.

3. A transfer sheet according to claim 1, wherein the layer having a refractive index of about 1.5 or lower is formed of a fluoro-olefin copolymer, a polymer having a fluorine-containing aliphatic ring structure, a perfluoroalkylether copolymer, a fluorine-containing (meth)acrylate polymer or a mixture of two or more thereof.

4. A transfer sheet according to claim 1, wherein the layer having a refractive index of about 1.5 or higher is formed of a polyalkyl (meth)acrylate, a polystyrene, a polycarbonate, a polyethylene terephthalate, a polyvinyl chloride, a polyvinyl naphthalene, a polyvinyl carbazole or a mixture of two or more thereof.

5. A transfer sheet according to claim 1, wherein the protective layer functions as a hard coat.

6. A transfer sheet according to claim 5, wherein the protective layer further has at least one or more of an antistatic function, an electromagnetic wave blocking function and a light-proof function.

7. A transfer sheet according to claim 1, wherein the releasable base film is a base film covered by a releasing layer.

8. A transfer sheet according to claim 1, wherein a pattern layer is provided between the protective layer and the adhesive layer.

9. A method of manufacturing a molded article having a low-reflection laminate comprising the steps of:

sandwiching a transfer sheet having a low-reflection laminate according to claim 1 between injection dies;

injecting a melted resin composition over the adhesive layer side to simultaneously form a molded resin article and adhere the transfer sheet to a surface of the molded resin article; and exfoliating the releasable base film.

10. A method according to claim 9, wherein the transparent low-reflection laminate of the transfer sheet is made of an organic polymer and has a refractive index of 1.3 to 1.5 and a thickness of 0.08 to 0.15 μm.

11. A method according to claim 9, wherein the transparent low-reflection laminate of the transfer sheet comprises two layers of organic polymers having different refractive indices, one of the two layers having a refractive index of 1.3 to 1.5 and a thickness of 0.08 to 0.15 μm, the other layer having a refractive index of 1.5 to 1.9 and a thickness of 0.08 to 5.0 μm, and the layer having a lower refractive index being located at the releasable base film side.

12. A molded article as produced by the method of claim 9 comprising:

an adhesive layer;

a protective layer; and a transparent low-reflection laminate successively laminated on a surface of the molded article, wherein said laminate comprises two layers formed only of organic polymers and having different refractive indices.

13. A molded article according to claim 12, wherein the molded article is for surfaces of polarizing plates used in displays for word processors, computers, television sets, display panels, cellular phones, liquid crystal display devices; optical lenses formed of transparent plastic materials of sunglasses, glasses or viewfinders of cameras; display sections of measuring instruments; and windowpanes of cars and trains.

14. A method of manufacturing a molded article having a low-reflection laminate comprising the steps of:

placing a transfer sheet having a low-reflection laminate according to claim 1 on a molded article so that the adhesive layer contacts the molded article;

applying thermocompression from the base film side, thereby adhering the transfer sheet to a surface of the molded article; and exfoliating the releasable base film.

15. A method according to claim 14, wherein the thermocompression is applied at a pressure of about 5 to 20 kg/cm$^2$ by using a silicon rubber roller whose surface temperature is set to a temperature of about 150 to 250° C.

16. A method according to claim 14, wherein the transparent low-reflection laminate of the transfer sheet is made of an organic polymer and has a refractive index of 1.3 to 1.5 and thickness of 0.08 to 0.15 μm.

17. A method according to 14, wherein the transparent low-reflection laminate of the transfer sheet comprises two layers of organic polymers having different refractive indices, one of the two layers having a refractive index of 1.3 to 1.5 and a thickness of 0.08 to 0.15 μm, the other layer having a refractive index of 1.5 to 1.9 and a thickness of 0.08 to 5.0 μm, and the layer having a lower refractive index being located at the releasable base film side.

18. A molded article as produced by the method of claim 14, comprising:

an adhesive layer;

a protective layer; and a transparent low-reflection laminate successively laminated on a surface of the molded article wherein said laminate comprises two layers formed only of organic polymers and having different refractive indices.

19. A molded article according to claim 18, wherein the molded article is for surfaces of polarizing plates used in displays for word processors, computers, television sets, display panels, cellular phones, liquid crystal display devices; optical lenses formed of transparent plastic materials of sunglasses, glasses of viewfinder of cameras; display sections of measuring instruments; and windowpanes of cars and trains.

* * * * *